Oct. 8, 1968    V. M. CINANNI    3,404,443

SAG COMPENSATOR FOR GEAR MACHINE WORK SPINDLE

Filed Dec. 20, 1966    2 Sheets-Sheet 1

INVENTOR.
VINCENT M. CINANNI
BY *Richard W. Treverton*
ATTORNEY

Oct. 8, 1968 V. M. CINANNI 3,404,443
SAG COMPENSATOR FOR GEAR MACHINE WORK SPINDLE
Filed Dec. 20, 1966 2 Sheets-Sheet 2

United States Patent Office 3,404,443
Patented Oct. 8, 1968

3,404,443
SAG COMPENSATOR FOR GEAR MACHINE WORK SPINDLE
Vincent M. Cinanni, Rochester, N.Y., assignor to The Gleason Works, Rochester, N.Y., a corporation of New York
Filed Dec. 20, 1966, Ser. No. 603,322
7 Claims. (Cl. 29—90)

ABSTRACT OF THE DISCLOSURE

A running test or lapping machine for bevel and hypoid gears has the spindle which carries the larger gear of a pair journaled in a vertical slide that is adjusted by a vertical screw. A graduated dial on the screw shows the magnitude of the slide adjustments, and is read against a zero-setting mark on a ring beneath the dial. To compensate for sagging of the spindle due to the weight of the gear and the means for holding it on the spindle, the ring is adjustable around the dial to change the position of the zero-setting mark. The ring is provided with a pointer that is read against a two-dimensional scale which shows the approximate setting which will compensate for gears and work holders of various weights and proportions.

---

The present invention relates to a gear machine or the like in which a bevel or hypoid gear may be mounted on a horizontal spindle for testing by running with a mating pinion or for finishing, for example by lapping or burnishing by running with a pinion or pinion-shaped tool.

In the case of large gears, where the work holding equipment is also massive, difficulty arises from the sagging of the gear spindle due to the weight of the gear and work holder and the fact that their center of gravity is at a relatively long distance from the bearings in which the spindle is journaled, resulting in large moments acting to deflect the spindle housing and related spindle-supporting parts of the machine. The object of the present invention is a simple and easily operated means to compensate for this sagging by adjusting a vertical slide of the machine.

A machine according to the invention comprises a frame supporting a first housing in which a horizontal spindle for a workpiece is journaled and a second housing which supports means for acting against the workpiece, said spindle being adapted to support on one end thereof a work holder on which the workpiece is mounted, one of said housings comprising a slide member vertically adjustable on a column member on the frame by means of a vertical screw which is rotatable in one member and screw-threaded to the other member, the screw carrying a dial and said one member supporting a ring coaxial with the screw and dial, and the dial and ring having cooperating scale indicia for the adjustments made by the screw, wherein the improvement comprises said ring being adjustable about the screw axis, and said ring and a part on said one member adjacent thereto having cooperating scale and pointer means, the scale being graduated to show the adjustment of said ring which will compensate for sag of the spindle caused by work holders and workpieces of various weights and axial dimensions. Preferably the scale is two-dimensional, having ordinates which respectively represent (a) the distance between a reference point on the spindle axis and the cone apex of the work gear and (b) the moment of the work holder and gear about said reference point.

A preferred embodiment of the invention as applied to a gear testing and lapping machine is shown in the accompanying drawings wherein.

Figure 1:
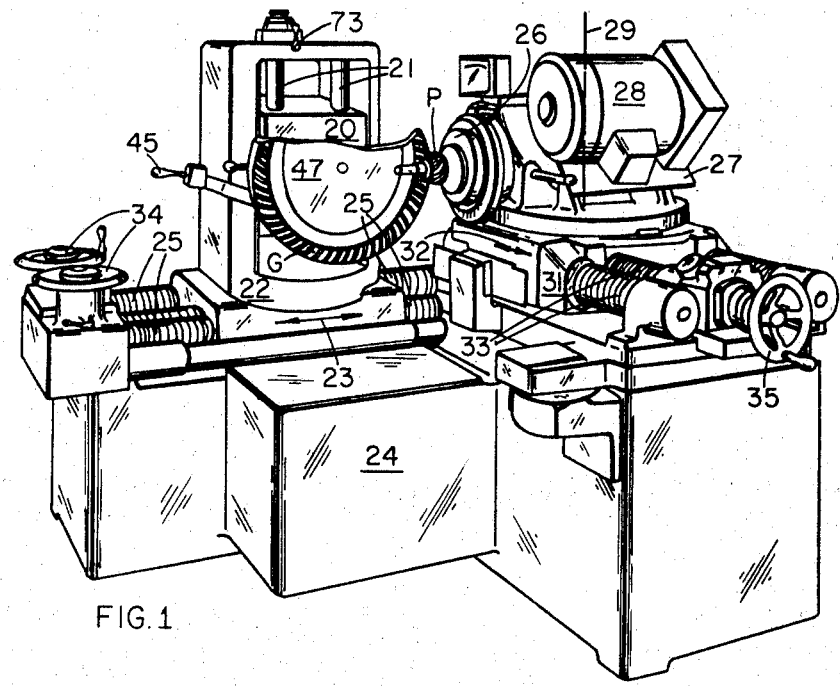
FIG. 1 is a perspective view of the machine with a bevel gear and pinion mounted thereon.

Referring to FIG. 1, a slide which constitutes housing 20 for the supporting spindle of bevel gear G is adjustable vertically along guide rods 21 in a column 22. The column itself is adjustable horizontally, in the direction indicated by arrow 23, on frame 24, guided by rods covered by flexible tubular sheathes 25. The pinion P to be run with gear G is mounted on a horizontal spindle 26 journaled in a housing 27 and driven through a belt drive, not shown, by a motor 28. Housing 27 is adjustable about vertical axis 29 on a horizontal slide 31. The latter is adjustable on frame 24 in the direction shown by arrow 32, guided by rods within flexible sheathes 33.

The adjustments in directions 23 and 32 may be made in the usual manner by means of screws, not shown, operated by handwheels 34 and 35. Similarly, referring to FIGS. 2 and 4, the vertical adjustment of housing 20 may be made by turning a vertical adjusting screw, 36, which is rotatable in column 22 and is threaded to a nut 37 secured to the housing. The adjusting screw may be turned by means of a wrench applied to a socket 38 provided in its upper end. The magnitudes of small vertical adjustments may be read on a dial 39 that is releasably secured to the adjusting screw by a set screw 41, FIG. 4. By the several adjustments described, gears and pinions of various sizes and designs within the capacity range of the machine may be brought into mesh in proper running relation.

Figure 2:
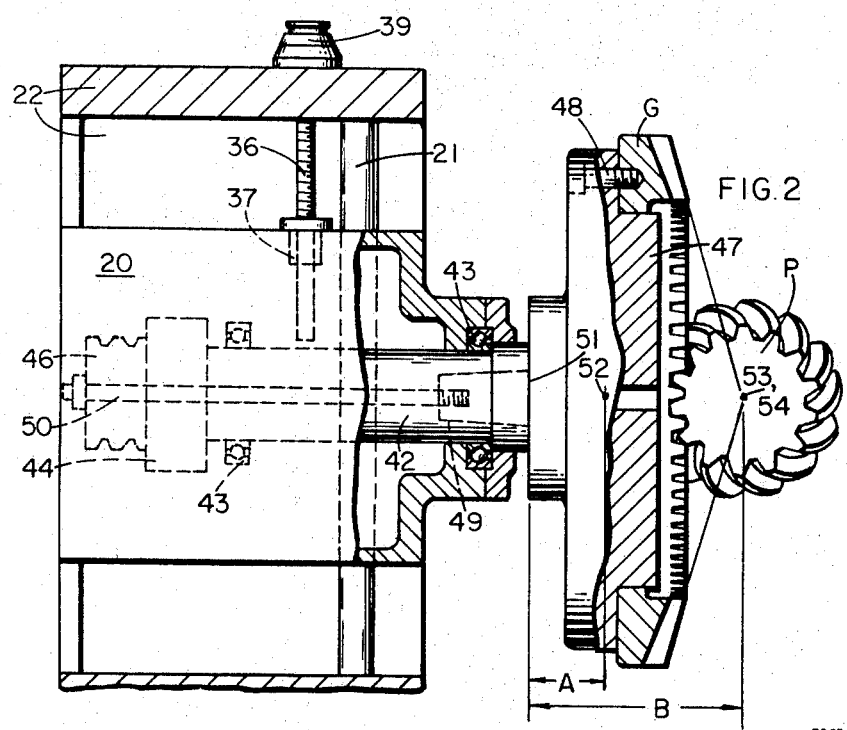
FIG. 2 is a vertical section in planes, parallel to the gear spindle, through the column supporting the slide which constitutes the spindle housing.

While the gears are being driven by motor 28, a torque load may be applied by braking the gear G. Referring to FIG. 2, the gear spindle 42 of the machine, journaled for rotation in the housing 20 on antifriction bearings 43, may be braked either by a friction brake 44, controlled by lever 45, FIG. 1, or by an electromagnetic or hydraulic brake belted to a pulley 46 on the spindle and controlled by appropriate means, not shown.

The gear G is supported on the spindle by a suitable work holder which in the illustrated embodiment is an arbor 47 to which gear is secured by screws 48. The arbor has a tapered shank 49 received in a similarly tapered bore in the spindle and is drawn against the front or mounting face 51 of the spindle by a draw bolt 50 which is threaded into the arbor and extends axially through the spindle. The gear G itself is often quite massive, particularly in the case of high reduction gearing, and often the arbor is even heavier. Their combined total weight and the fact that their center of gravity 52 is at a substantial distance from the bearings 43, cause the spindle to sag, with the result that if no compensation is made the spindle axis will incline downwardly, from left to right in FIG. 2, so that the cone apex 53 of the gear will be lower than intended in relation to the pinion axis 54. This sagging has several components, including deflections of bearings 43, of the housing 20 relative to column 22, and of the column itself. In FIG. 2 the apex and axis 53, 54, are shown as being coincident.

It has been found that the magnitude of the sagging of the spindle under the load of the gear and work holder can be compensated for by information that is known to or easily obtained by the user of the machine, this information consisting of (1) the combined weight of the gear and work holder, (2) the distance, designated A, of their center of gravity from the mounting face 51 of the spindle, and (3) the distance, B, of the cone apex 53 of the gear from the mounting face.

Figure 3:
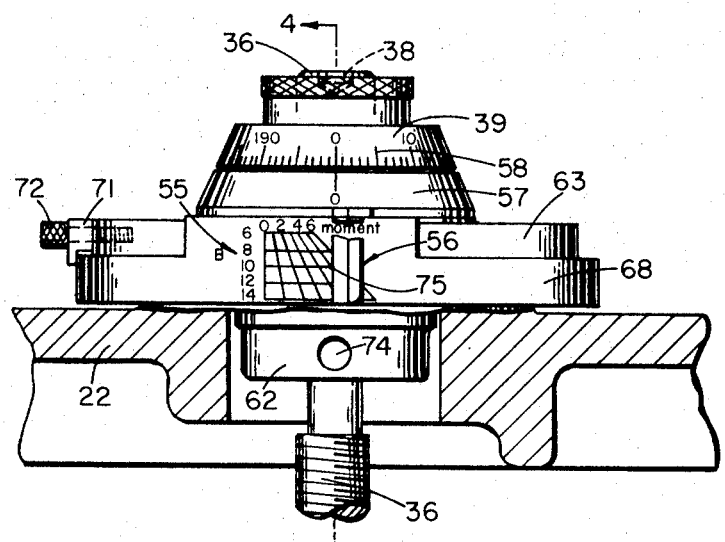
FIG. 3 is a side elevation of the sag compensator, with the adjacent portion of the column appearing in section.
Figure 4:
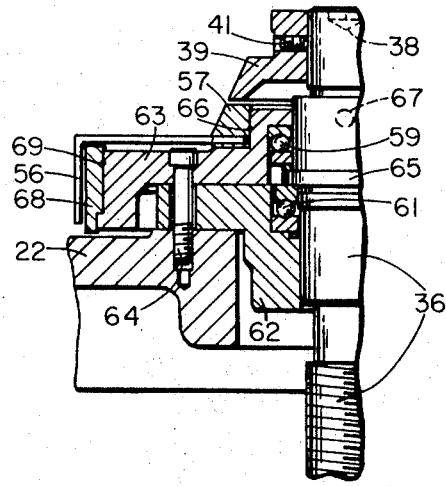
FIG. 4 is a fragmentary section through the compensator and adjacent portion of the column in the plane designated 4—4 in FIG. 3.

For utilizing this information to compensate for sag, the machine is provided with a two-dimensional scale or chart 55, FIG. 3, and a cooperating pointer 56, one of which is carried by the column 22 and the other by a zero-setting dial ring 57 against which a scale 58 on dial 39 is read. Referring to FIG. 4, the adjusting screw 36 is supported for rotation by ball bearings 59 and 61, a flange 65 on the screw being confined between the adjacent races of these bearings. The other two races of the bearings are seated respectively in a bearing housing 62 and in a bearing housing cap 63, both of which are secured by screws 64 to the column 22.

The dial ring 57 is manually rotatable on a cylindrical surface 66 of cap 63 that is coaxial of the adjusting screw 36 and dial 39, and may be secured to the cap by means of a set screw 67, similar to screw 41 which holds the dial fast on the adjusting screw. Pointer 56, whose left edge (in FIG. 3) is a knife edge closely overlying the scale 55, is secured rigidly to the dial ring. The scale is provided, by etching or otherwise, on a compensator ring 68 which is manually rotatable around another cylindrical surface 69, on the bearing cap 63, coaxial of cylindrical surface 66. A clamp block 71, tightened by a clamp screw 72 threaded to the cap 63, is provided to hold the compensator ring against unintentional rotation.

The two-dimensional scale 55 has ordinates representing respectively the dimension B, FIG. 2, which is the distance of the gear cone apex 53 from a reference point on the spindle, and the moment of the combined mass of the gear and work holder about the same reference point, which in the illustrated embodiment is the intersection point of the gear spindle axis with the plane of the mounting face 51. The distance B is read vertically on the scale against the horizontal lines designated by inch numerals "6, 8, 10, 12, 14" if the English system is employed, or by approximately equivalent marking in millimeters "150, 200, 250, 300 and 350" when the metric system is used. The transverse lines marked "0, 2, 4, 6" designated "moment" used for the English system represent moments in thousands of inch-pounds, these moments being the products of the combined weight of the gear G and work holder 47, in pounds, multiplied by the distance A in inches. When the metric system is used these markings may represent thousand kilogram-centimeter units.

In setting up the machine for operation the several adjustments, in horizontal directions 23, 32, vertically along guide rods 21, and around axis 29, are usually made before the work holders for the gear and pinion are mounted. These adjustments are frequently made with the assistance of set-up gages including bars which are secured to the spindles in place of the work holders. In this way, for dealing with bevel gears, the axes of the spindles 26 and 42 may be made to intersect at the desired angle and at the desired distance from the mounting faces of the spindles. Or, for hypoid gears, the appropriate vertical offset of the spindles' axes may be provided. The set up of the machine takes into account not only the dimensions of the gears themselves but also those of the work holding equipment.

When using the present invention the combined weight of the gear and gear arbor, and their center of gravity, are determined either by calculation or by weighing and balancing. From this data the moment which constitutes the product of the weight multiplied by the dimension A, FIG. 2, is easily determined. The distance B, FIG. 2, will also be known from the gear and arbor design data. The machine set-up made with set-up gages, including the adjustment of screw 36 to bring the spindle axes to the desired intersecting or offset relation, is made with the set-screws 41 and 67 and the clamp 71 loosened. The adjusting screws are then clamped, the vertical adjusting screw 36 being clamped for example by means of lever-operated clamp screw 73, FIG. 1, which is threaded to the column 22 and extends through opening 74, FIG. 3, in the bearing housing 62. The compensating ring 68 is now turned to a position convenient to the operator and clamped by tightening the screw 72. Dial ring 57 is next rotated to bring the reading edge of the pointer 56 (the left edge in FIG. 3) to the "0" moment ordinate and clamped by set screw 67.

Dial 39 is next rotated to align the zero on its scale 58 with the zero line on the dial ring 57, and is clamped by tightening set screw 41. Set screw 67 is now released and dial ring 57 is rotated to bring the pointer edge to the appropriate sag compensating position. For example, if the moment has been determined to be five thousand inch-pounds and dimension B is ten inches, the pointer is brought to the particular intersection 75 of the coordinate lines of scale 55 that the reading edge of the pointer overlies in FIG. 3. Set screw 67 is then retightened and the clamp screw 73 is released; the adjusting screw 36 is rotated to re-align the zero marks of the dial and the dial ring, and the clamp screw 73 is retightened. Compensation has now been made for the anticipated sag of the gear cone apex, by raising the housing 20 by appropriate counterclockwise rotation of the adjusting screw 36, whose thread is left hand, as shown. The machine is now ready for the mounting and running of the gears. During the running operation the machine may be readjusted to change the position of the tooth bearing of the gears, without affecting the adjusted positions of the compensating ring 68 and dial ring 57. Such readjustments may include moving the gear spindle vertically by turning screw 36, the magnitude of such movement being read by the position of the zero line of the dial ring relative to the scale 58.

As will be apparent to those skilled in the art, the two-dimensional scale or chart 55 may be readily constructed from measured deflections of the machine spindle, such deflections being caused by suspending in succession a series of different masses of known value from a rigid bar, attached to the spindle 42 in essentially the same way that the arbor 47 is attached. The deflections of the spindle may be measured with these masses suspended from the bar at various different measured distances from the mounting face 51. In the preparation of the scale from these measured deflections, it is only necessary to take into account the lead of the screw 36 and the radial distance of scale from the screw axis, i.e., the outside radius of the compensator ring 68, to assure that the amount read on the scale will effectively compensate for the actual sag of the cone apex 53.

In the illustrated embodiment the sag compensator is applied only to the gear spindle for the reason that the pinion and the work holder supporting it are usually of such small mass relative to the rigidity of the supporting structure 26, 27, 31, 24, that such sagging as may occur is inconsequential. However it will be apparent to those skilled in the art that should occasion demand, for example with a machine of less rigid construction or intended for dealing with larger pinions, the invention may also be applied to the pinion spindle. In fact, the invention is not confined to machines for supporting both members of a pair of gears. It is also applicable to other machines, for example to a machine in which a device or tool, other than a pinion or pinion-shaped tool, is mounted on the housing 27 for acting against a gear G or other workpiece on spindle 42.

Having now described my invention and its mode of use, what I claim is:

1. A gear machine or the like comprising a frame supporting a first housing in which a horizontal spindle for a workpiece is journaled and a second housing which supports means for acting against the workpiece, said spindle being adapted to support on one end thereof a work holder on which the workpiece is mounted, one of said housings comprising a slide member vertically adjustable on a column member on the frame by means of a vertical screw which is rotatable in one member and screw-threaded to the other member, the screw carrying a dial and said one member supporting a ring coaxial with the screw and dial, and the dial and ring having cooperating scale indicia for the adjustments made by the screw, wherein the improvement comprises said ring being adjustable about the screw axis, and said ring and a part on said one member adjacent thereto having cooperating scale and pointer means, the scale being graduated to show the adjustment of said ring which will compensate for sag of the spindle caused by work holders and workpieces of various weights and axial dimensions.

2. A machine according to claim 1 for workpieces which are bevel or hypoid gears, wherein the scale with which the pointer cooperates is two-dimensional, having ordinates which respectively represent (a) the distance between a reference point on the spindle axis and the cone apex of the work gear and (b) the moment of the work holder and gear about said reference point.

3. A machine according to claim 1 for workpieces which are bevel or hypoid gears in which the means supported by the second housing comprises a spindle for a pinion adapted to run with the work gear, and said housings are relatively adjustable horizontally on the frame to bring the gear and pinion to meshing relation.

4. A machine according to claim 1 in which said dial is angularly adjustable on the screw about the axis of the latter and said part is another ring angularly adjustable on said one member about said axis.

5. A machine according to claim 1 in which said first housing is adjustable vertically in said column member.

6. A gear machine or the like comprising a frame supporting a column in which a spindle housing is vertically adjustable by means of a vertical screw which is rotatable in the column and screw-threaded to the housing, a horizontal spindle journaled in the housing and adapted to support against the mounting face thereof a work holder for a bevel or hypoid gear, a second housing on the frame journaling a horizontal spindle for a work pinion to mate with the work gear, said column and second housing being relatively adjustable horizontally on the frame to bring the gear and pinion into meshing relation, the screw having a dial secured for angular adjustment thereon and the column having a ring secured thereto for angular adjustment thereon about the axis of the screw and dial, and the dial and ring having cooperating scale indicia for the magnitude of vertical adjustments made by turning the screw, wherein the improvement comprises a second ring secured to the column for angular adjustment thereon about the axes of the screw and dial to compensate for sag of the gear spindle due to the presence of the work holder and workpiece thereon, one of said rings having a pointer thereon and the other having a cooperating two-dimensional scale whose ordinates respectively represent (a) the distance between a reference point on the gear spindle axis and the cone apex of the gear and (b) the moment of the work holder and gear about said reference point.

7. A machine according to claim 6 in which said reference point on the gear spindle axis lies in the plane of said mounting face, transverse of the last-mentioned axis.

References Cited

UNITED STATES PATENTS 2,952,067  9/1960  Olson _____ 29—90

RICHARD H. EANES, JR., *Primary Examiner.*